United States Patent Office 3,297,820
Patented Jan. 10, 1967

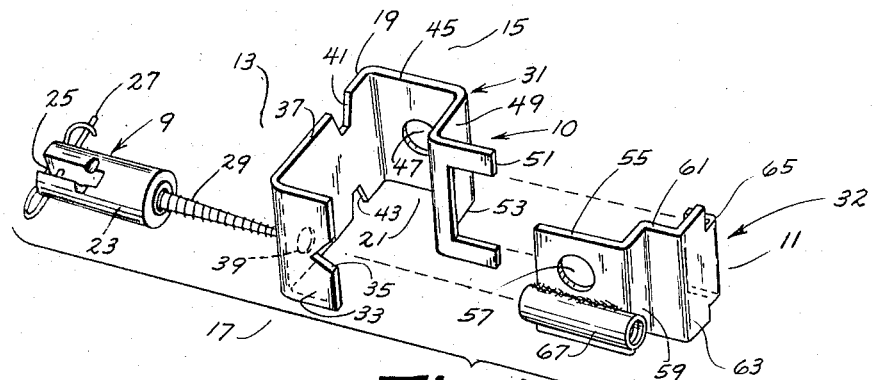
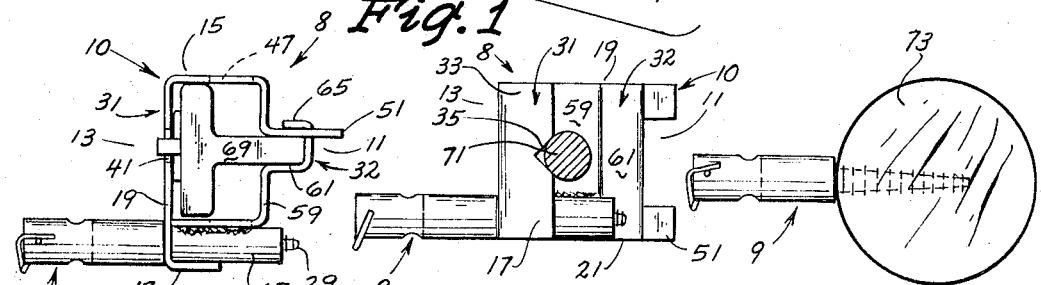
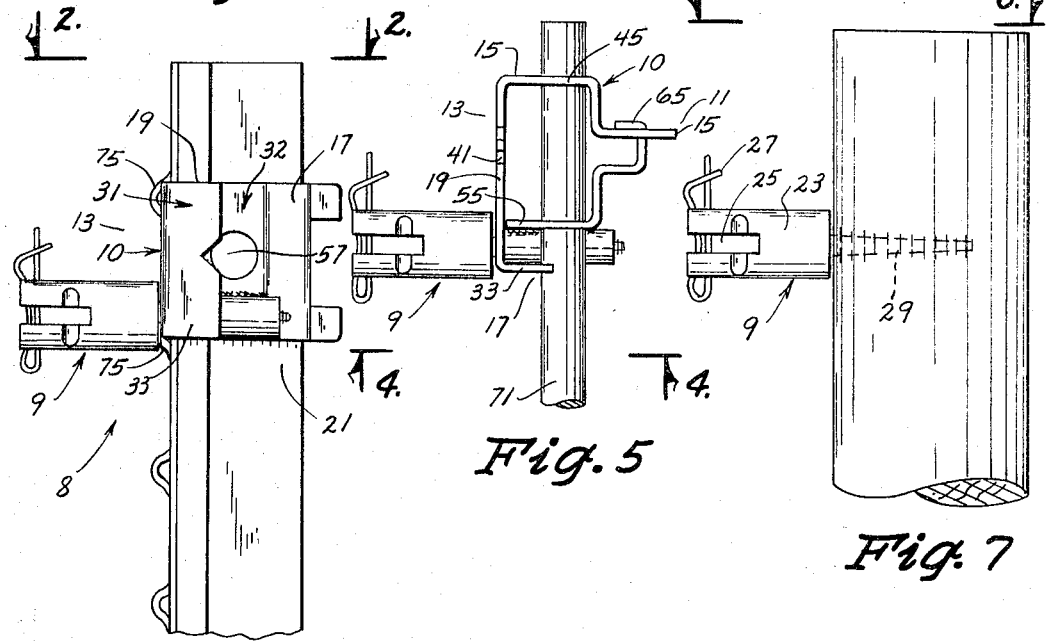
INVENTORS
JOHN P. KEW
MELVIN E. KEW
BY
ATTORNEYS

3,297,820
ELECTRIC FENCE INSULATOR DEVICE
Melvin E. Kew, R.R. 1, Box 111, and John P. Kew,
R.R. 1, Box 132, both of Sheffield, Iowa 50475
Filed May 3, 1965, Ser. No. 452,686
4 Claims. (Cl. 174—163)

This invention relates to an electric fence insulator device and more particularly to an electric fence insulator device which may be secured to a variety of different types of fence posts.

Electric fences are commonly used by farmers and the like to discourage farm animals from contacting the fence and to maintain the animals within a particular confine. The wires strands are electrically energized and are supported on fence posts by means of insulators which prevent the passage of electrical current from the wire to the fence post.

Heretofore, it has been necessary to have several different types of insulators due to the fact that several different types of fence posts are used, such as T-posts, wood posts and round posts. Also, the insulators available today are easily broken and become detached from the fence posts quite easily.

Therefore, it is a principal object of this invention to provide an electric fence insulator device which may be used in a variety of different types of fence posts.

A further object of this invention is to provide an electric fence insulator device which will not be easily broken.

A further object of this invention is to provide an electric fence insulator device which resists inadvertent disengagement from the fence post.

A further object of this invention is to provide an electric fence insulator device which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is an exploded perspective view of the device;
FIG. 2 is a top view of the device mounted on a T-post as seen on line 2—2 of FIG. 3;
FIG. 3 is a side view of the device mounted on a T-post;
FIG. 4 is a sectional view of the device mounted on a round rod as seen on line 4—4 of FIG. 5;
FIG. 5 is a side view of the device mounted on a round rod;
FIG. 6 is a top elevational view illustrating a portion of the device secured to a wooden post as seen on line 6—6 of FIG. 7; and
FIG. 7 is a side elevational view illustrating a portion of the device secured to a wooden post.

The insulator means is generally indicated at 8 in the drawings and includes a combination insulator-fastening means 9 and a bracket 10 having a rearward end 11, forward end 13, opposite sides 15 and 17, top 19 and bottom 21. Insulator-fastening means 9 includes a head portion 23 comprised on an insulator material having a slot 25 formed in its outer end and which is adapted to detachably receive a spring clip extending through holes formed therein. Insulator-fastening means 9 also includes a threaded shank portion 29 extending therefrom as best seen in FIG. 1.

As best seen in FIG. 1, bracket 10 includes jaw members 31 and 32 which are adapted to be detachably secured together as will be later described. Jaw member 31 is comprised of a jaw portion 33 having a notch 35 formed in its rearward end; a jaw portion 37 extending transversely from the forward end of jaw portion 33 and which is provided with an opening 39 formed therein and a pair of vertically disposed notches 41 and 43 formed in its upper and lower edges respectively; a jaw portion 45 extending rearwardly from jaw portions 37 at a right angle thereto and in a parallel plane with jaw portion 33 and which is provided with an opening 47 formed therein; a jaw portion 49 extending transversely from the rearward end of jaw portion 47 in a parallel plane with jaw portion 37; and jaw portion 51 having a cutaway portion 53 formed therein which extends rearwardly from jaw portion 49 in a parallel plane with jaw portion 33. Jaw member 32 includes a first jaw portion 55 having an opening 57 formed therein; a second jaw portion 59 extending transversely from the rearward end of jaw portion 55; a third jaw portion 61 extending rearwardly from jaw portion 59 at a right angle thereto; a fourth jaw portion 63 extending transversely from the rearward end of third jaw portion 63; and a fifth jaw portion 65 extending first in a parallel plane with fourth jaw portion 63 and then extending forwardly therefrom as best seen in FIG. 1. Secured to first jaw portion 55 by means of welding or the like is a hollow, elongated collar 67 having internal threads. The numerals 69, 71 and 73 generally designate a T-post, a round rod and a wooden post respectively.

The device is adapted to be used on a T-post 69, a round rod 71 or a wood post 73. The device is placed on a T-post 69 by simply placing jaw member 31 adjacent one side of the T-post at the desired position and placing jaw member 32 adjacent the opposite side of the T-post so that jaw portion 65 of a jaw member 32 is received by cutaway portion 53 of jaw member 31 and so that collar 67 is aligned with opening 39 as illustrated in the drawings. Shank 29 of insulator-fastening means 9 is extended through opening 39 and is threadably received by the interior of collar 67. Jaw members 31 and 32 are drawn towards one another and into engagement with T-post 69 by simply threadably turning insulator-fastening means 9 until the device is firmly attached to the post. Notches 41 and 43 each receive protrusions 75 on T-post 69 which also aids in preventing vertical movement of the device with respect to the T-post. It can be seen that the device is secured to the T-post so that top 19 of bracket 10 is the uppermost portion of the device.

The device is installed on a round rod 71 by simply extending the rod through openings 47 and 57 and drawing jaw members 31 and 32 together as previously described. Jaw members 31 and 32 will be drawn together until notch 35 engages rod 71 as shown in FIG. 4 to prevent movement of the device with respect to the rod. It can be seen that the device has simply been rotated 90 degrees about a horizontal axis from the position which is assumed when it was mounted on the T-post. If desired, the device could be installed on rod 71 so that jaw portion 33 is positioned above jaw portion 45 rather than that shown in FIGS. 4 and 5.

A portion of the device may also be used to provide an insulator on a wood post by simply using insulator-fastening means 9 by itself. This is accomplished by screwing shank 29 into the wood post as seen in FIGS. 6 and 7.

In each of the adaptations previously described, the electric wire is simply caused to pass through slot 25 of insulator-fastening means 9 and is maintained therein by spring clip 27.

Thus it can be seen that an insulating means is provided which may be used on a variety of different types of supporting posts. It is no longer necessary to maintain a large inventory of several different types of insulators to fit a variety of different posts. It can also be seen that the insulator means described herein will not become easily broken or dislodged from the supporting post.

Thus it can be seen that the device accomplishes at least all of its stated objectives.

Some changes may be made in the construction and arrangement of our electric fence insulator device without departing from the real spirit and purpose of our invention, and it is our intention to cover by our claims, any modified forms of structure or use of mechanical equivalents which may be reasonably included within their scope.

We claim:

1. In an insulator means,
   a bracket including first and second jaw members adapted to be detachably fastened together and having rearward and forward ends, opposite sides, a top and a bottom,
   said first jaw member comprising a forwardly extending first jaw portion having a notch formed in its rearward end; a second jaw portion extending transversely from the forward end of said first jaw portion and having an opening formed therein; a third jaw portion extending rearwardly from said second jaw portion in a parallel plane to said first jaw portion and having an opening formed therein; a fourth jaw portion extending transversely from the rearward end of said third jaw portion in a parallel plane to said second jaw portion; and a fifth jaw portion extending rearwardly from said fourth jaw portion and having a cutaway portion formed in its rearward end,
   said second jaw member comprising a rearwardly extending first jaw portion having an opening formed therein and an elongated collar secured thereto having internal threads; a second jaw portion extending at a right angle from the rearward end of said first jaw portion; a third jaw portion extending rearwardly from said second jaw portion; a fourth jaw portion extending at a right angle from the rearward end of said third jaw portion; and a fifth jaw portion extending from said fourth jaw portion first in a parallel relationship thereto and thence transversely forwardly therefrom and being adapted to be received by said cutaway portion in said fifth jaw portion of said first jaw member,
   said collar being aligned with said opening in said second jaw portion of said first jaw member when said fifth jaw portion of said second jaw member is received by said cutaway portion,
   and a fastening means having a threaded shank portion extending through said opening in said second jaw portion of said second jaw into said collar and adapted to detachably fasten said first and second jaw members together, said fastening means having a head portion of insulative material which is adapted to detachably receive a wire member.

2. The insulator means of claim 1 wherein said second jaw portion of said first jaw member has a pair of vertically spaced notches formed therein, each of said notches being adapted to receive protrusions extending from a T-post.

3. In an insulator means,
   a bracket comprised of first and second jaw members, said first and second jaw members being separable and movable parts connected by a fastener which draws them together,
   said fastener having an insulative head portion adapted to detachably receive a wire member,
   said first and second jaw members having registering openings formed therein respectively which are adapted to receive a rod member extending therethrough at times said registered openings being aligned with each other along an axis which lies perpendicular to the axis of said fastener,
   said fastener being adapted to secure said first and second jaw members together on the rod to prevent movement of said bracket with respect to the rod when the rod is received by said registering openings.

4. The insulator of claim 3 wherein said bracket has a substantially T-shaped opening formed therein between said first and second jaw members when said first and second jaw members are fastened together, said bracket adapted to receive a T-shaped post in its T-shaped opening when said bracket is rotated 90 degrees about a horizontal axis relative to its position which it has when the rod is received by said registering openings.

References Cited by the Examiner

UNITED STATES PATENTS

| | | | |
|---|---|---|---|
| 1,764,071 | 6/1930 | Foulke. | |
| 2,618,685 | 11/1952 | Lewis | 174—163 X |
| 2,931,853 | 4/1960 | Wilson. | |
| 2,972,007 | 2/1961 | Zoeller | 174—163 |

LARAMIE E. ASKIN, *Primary Examiner.*